(12) United States Patent
Fontaine

(10) Patent No.: US 10,487,220 B2
(45) Date of Patent: Nov. 26, 2019

(54) ELASTOMERIC COATING COMPOSITION

(71) Applicant: Halo Composites, LLC, Fort Pierce, FL (US)

(72) Inventor: Matthew Fontaine, Fort Pierce, FL (US)

(*) Notice: Subject to any disclaimer, the term of this patent is extended or adjusted under 35 U.S.C. 154(b) by 0 days.

(21) Appl. No.: 16/041,958

(22) Filed: Jul. 23, 2018

(65) Prior Publication Data
US 2018/0327610 A1   Nov. 15, 2018

Related U.S. Application Data

(63) Continuation-in-part of application No. 15/717,198, filed on Sep. 27, 2017, now Pat. No. 10,053,586, and a continuation of application No. 15/056,052, filed on Feb. 29, 2016, now abandoned.

(60) Provisional application No. 62/126,587, filed on Feb. 28, 2015.

(51) Int. Cl.
| | | |
|---|---|---|
| C09D 7/00 | (2018.01) | |
| C09D 5/20 | (2006.01) | |
| C09D 153/00 | (2006.01) | |
| C09D 7/48 | (2018.01) | |
| C09D 7/65 | (2018.01) | |
| C09D 7/20 | (2018.01) | |
| C09D 7/61 | (2018.01) | |
| C09D 7/42 | (2018.01) | |
| C09D 7/40 | (2018.01) | |
| C09D 153/02 | (2006.01) | |

(52) U.S. Cl.
CPC ............ *C09D 5/20* (2013.01); *C09D 7/20* (2018.01); *C09D 7/40* (2018.01); *C09D 7/42* (2018.01); *C09D 7/48* (2018.01); *C09D 7/61* (2018.01); *C09D 7/65* (2018.01); *C09D 153/00* (2013.01); *C09D 153/025* (2013.01)

(58) Field of Classification Search
CPC .......... C09D 5/20; C09D 7/001; C09D 7/125; C09D 7/1216; C09D 7/1241; C09D 7/20; C09D 7/48; C09D 7/61; C09D 7/65; C09D 153/00
See application file for complete search history.

(56) References Cited

U.S. PATENT DOCUMENTS

| | | | |
|---|---|---|---|
| 4,329,247 A | 5/1982 | Palmer | |
| 4,536,454 A | 8/1985 | Haasl | |
| 4,745,139 A | 3/1988 | Haasl | |
| 5,192,608 A | 3/1993 | Haasl | |
| 5,256,716 A | 10/1993 | Haasl | |
| 9,273,214 B1 | 3/2016 | Figliozzi | |
| 2010/0210745 A1* | 8/2010 | McDaniel | C09D 5/008 521/55 |
| 2016/0152871 A1* | 6/2016 | Bieber | C08L 23/0815 521/140 |

* cited by examiner

*Primary Examiner* — Robert D Harlan
(74) *Attorney, Agent, or Firm* — GrayRobinson, P.A.

(57) ABSTRACT

An elastomeric coating composition to enhance or alter the aesthetic appearance of an automobile. The coating composition can be applied by spraying onto either a vehicle paint job or clear coat and is semi-permanent upon drying. The coating composition can be manually removed from the vehicle by peeling without damaging the underlying paint job or clear coat on the vehicle. The coating is made up of a polymer, a mid-block modifier, a tackifier, a thixotrope, a solvent blend, an antioxidant, and a UV stabilizer. A matting agent, static electricity mitigation agent, and a silica suspension agent may also be incorporated into the composition. A 2K gloss can be applied to the coating composition after application.

3 Claims, No Drawings

ELASTOMERIC COATING COMPOSITION

CROSS REFERENCE TO RELATED APPLICATIONS

This application is a continuation-in-part of application Ser. No. 15/717,198 filed on Sep. 27, 2017 entitled "Method of Applying Elastomeric Coating Composition" which claims priority to application Ser. No. 15/056,052 filed on Feb. 29, 2016 entitled "Elastomeric Coating Composition and Method of Applying Same" which claims priority to Provisional Application No. 62/126,587 filed on Feb. 28, 2015 and entitled "Elastomeric Coating Composition and Method of Applying Same." The content of these applications are fully incorporated herein for all purposes.

BACKGROUND OF THE INVENTION

This invention relates to an elastomeric coating specifically engineered to enhance or alter the aesthetic appearance of an automobile or other vehicles and its application. In traditional settings, automobile paint shops change the color and finish of trucks, cars, and other vehicles by applying permanent paint to the exterior of the vehicle. This process is extremely time consuming, expensive, and irreversible unless the owner starts over and re-paints the vehicle again.

Other aesthetic enhancements to vehicles include pin stripe appliques or the like. These kinds of embellishments are often glued to the surface of the vehicle to provide a unique look to the exterior finish and are generally intended to be permanent.

The main kinds of temporary exterior enhancements to a vehicle finish are often magnetized or attached with a removable glue, neither of which is durable.

A need exists in the art of automobile finishing for a solution to the problem that individuals and businesses prefer to decorate their vehicles with finishes that are removable without having to re-paint or re-apply a permanent finish again and again.

Therefore, it is an object of this invention to provide an improvement which overcomes the aforementioned inadequacies of the prior art devices and provides an improvement which is a significant contribution to the advancement of the vehicle exterior finishing art.

BRIEF SUMMARY OF THE INVENTION

For the purpose of summarizing this invention, this invention comprises a coating composition for vehicles, comprises a polymer, a tackifier, a hydrocarbon resin; and a solvent. Specifically, the composition preferably comprises a styrene/ethylene/butylene/styrene liner triblock copolymer, a tackifier, a mid-block modifier of the copolymer, a thixotrope, a solvent blend, a surfactant, at least one UV stabilizer, a matting agent, an antioxidant, a static electricity mitigation agent, and a silica suspension agent.

Specifically, the coating composition preferably includes a styrene/ethylene/butylene/styrene liner triblock copolymer in an amount by volume of 4.0-12.0%; a mid-block modifier in an amount by volume of 1.0-5.0%; a tackifier in an amount by volume of 0.5-3.0%; a thixotrope in an amount by volume of 0.5-3.0%; an antioxidant in an amount by volume of 0.1-0.5%; at least one UV stabilizer in an amount by volume of 0.2-1.0%; a surfactant in an amount by volume of 0.3-1.0%; a matting agent in an amount by volume of 0.2-1.0%; a static electricity mitigation agent in an amount by volume of 0.1-0.5%; a silica suspension agent in an amount by volume of 0.05-0.75%; and a solvent blend including a mixture of xylene, acetone, and naphtha in an amount by volume of 45-65% xylene, 1.0-10.0% acetone, and 15-35% naphtha. The use of a surfactant, static electricity mitigation agent, or silica suspension agent are optional and do not hinder the proper application of the present invention.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

DETAILED DESCRIPTION OF THE PREFERRED EMBODIMENT

In one embodiment, the coating of this disclosure is an elastomeric coating composition that is useful in part to cover the exterior finish of a vehicle in a semi-permanent manner. As used herein, the term "vehicle" encompasses all of the usual embodiments of a device used for travel, including but not limited to, automobiles and trucks. Other kinds of vehicles may also fall within the scope of this invention, such as more specialized uses like race cars, motorcycles, golf carts, or even boats. None of these examples limits the kinds of "vehicles" for which the coating described herein may be used.

The coating described in this disclosure is considered semi-permanent in that the coating, applied properly, does not wash off or fall off the vehicle after application, but stays in place on the vehicle until the user chooses to remove it. When the user or owner of a vehicle decides to remove the coating, the coating is amenable to being peeled off without harming the underlying original finish of the vehicle. The coating, however, does not detach from the original finish of the vehicle unless and until the user makes a concerted effort to peel the coating off of the vehicle. The coating as described herein allows for a clear gloss coat as a result and also allows for color changing applications.

When the coating is removed, the coating does not damage the underlying finish to which it has been applied. In one embodiment, the coating is an adherent film, configured for spraying onto a vehicle and having a formulation including, at least in part:

1) Thermoplastic rubber
2) Hydrocarbon resin
3) Tackifier
4) Solvent system using naphtha, xylene, and toluene
5) Thixotropic Silica
6) Anti-oxidant/UV stabilizers.

In one embodiment, the antioxidant and UV stabilizers are applied as a solution to the coating and allowed to air dry thereon. Subsequent layers provide for full coverage, where desired results can be achieved.

The coating described herein, therefore, relates to an improved elastomeric coating composition used to alter the original appearance of a vehicle and a number of its exterior components including, but not limited to, painted or clear coat surfaces, trim, wheels, rims, and badges, whereby future removal is allowed, returning the vehicle back to its originally equipped and manufactured state.

One method of the present invention includes the utilization of the coating solution to coat the vehicle in stages, where the initial coat and each subsequent layer is allowed to air dry thereby providing for a desired change or changes in appearance. The film is both adherent and of uniform composition, and forms a rugged composite shell which retains its elastomeric properties under prolonged UV exposure and other naturally occurring environmental elements. The composite film was engineered with an application-specific bond strength to achieve both adequate adhesion balanced with good removability characteristics, as well as superior tensile and peel strength properties. The quantity of tackifier used in the formulation is within a range and concentration so that the film is stable upon vehicle application and will stay on the outer surface of the vehicle so long as the owner desires, but with the tackifier used in proper quantities, the film peels off the surface of the vehicle without damaging the underlying original paint job or clear coat. In this way, the tackifier is used in the appropriate quantity and the film solution has a tackifier therein in a range of composition or concentration to ensure that the film is peel-able upon drying. The peeling force needed to remove the film after drying is within a range allowing for peeling by hand without damaging the original paint job and clear coat on the vehicle.

Generally, the present invention is an adherent-coherent coating system where a primer coat is not required. The coating can be sprayed directly onto an original equipment manufacturer vehicle finish. The coating described herein has made significant contributions to the development of a pigment carrier system and loading concentrations of the same in order to achieve the desired appearance after a specified number of coats. The preferred application technique for the coating is by pressurized spraying via HVLP (high volume low pressure) spraying equipment but the coating composition may be applied using any appropriate equipment or method now known or yet to be discovered.

The pigment carrier system used with the film described herein is important, as the color of the film can be very important for marketing and commercial applications. The pigments that are wetted into solution yield vibrant, deeper, or generally more aesthetically pleasing colors. The carriers used for the pigments may be based in a polyol compound and mineral oil mixture.

Typically composite coatings are measured by a number of desirable physical and chemical properties such as durability, adhesion, cohesion, and bond and peel strengths. As a rule, the inventor maximized each of these properties whenever possible; however, as often was the case, a tradeoff occurred, where the increase of one component led to an adverse reaction in the overall composite system; therefore, the inventor employed a measured compromise approach with respect to the conflicting properties in order to achieve a collection of desired use characteristics.

Research and trials of at least 100 attempts were employed using various types and ratios of styrene/ethylene/butylene elastomers, hydrocarbon resins, thixotropic silicas and solvents and respective ratios that best provided for adequate spray and finishing characteristics, strength and durability properties, coupled with desired bond and peel behaviors.

A number of various hydrocarbon resins were incorporated to help enhance the overall durability and scratch resistance not yet achieved by earlier formulations. After rigorous research and development, certain hydrocarbon resins, for example, but not limited to, Eastman's Plastolyn™ 290, have been identified as being one useful ingredient to aid the enhancement of the coatings overall look, feel, finish texture and enhanced mar resistance, again not seen by earlier formulations. Other purified aromatic monomers having similarly high softening points are also options for this line of coatings. In one embodiment, other aromatic hydrocarbon resins having a softening point of at least 140 degrees Celsius (according to ASTM D6493-11 (2015), Standard Test Methods for Softening Point of Hydrocarbon Resins and Rosin Based Resins) and a melt viscosity of about 1000 poise at 165 degrees Celsius could provide similar results. In another embodiment, the hydrocarbon resin exhibits a melt viscosity of 1,100 mPa·s (200° C.).

The same is true with the solvent ratios. Each solvent tested had specific properties that among other reactions, i.e. chemical—solubility parameters, Kb values, and polar and/or non-polar reactions, must be incorporated into the composite system in specific orders and quantities to aid in the proper homogeneous solution and subsequent end use via the high volume low pressure spraying equipment. More rigorous testing identified both the candidates and ratios thereof for use in the end composite solution.

As with all elastomeric films built to an adequate thickness, the subject coating shares similar properties in its imperviousness to acids, alkalis, salts, moisture, and capability of withstanding prolonged UV exposure while remaining flexible over a wide range of temperatures.

Therefore, it is a primary objective of the subject invention to provide an improved coating used in aid of altering or enhancing the appearance of the exterior of automobiles and method of doing the same. The dried composite film possesses superior texture such that a satin or vinyl look is achieved and bond, peel and tensile strength characteristics are optimized for end user ease of use.

Furthermore, another object of the subject invention is to provide an improved technique for coating the exterior of automobiles such that a smooth vinyl and/or satin like appearance can be achieved not seen in earlier formulations.

Furthermore, another object of the subject invention is to augment the invention using colorants, namely of organic and inorganic variety, but not limited to the use of automotive powders, flakes and pearls.

Other and further objects of the present invention will become apparent to those skilled in the art upon a study of the following specification and appended claims.

The thermoplastic rubber component consists of a styrene/ethylene/butylene/styrene linear triblock copolymer. The undusted hydrogenated version of these triblock copolymers is utilized.

This material is sprayed on the substrate, i.e. clear-coat to be coated in multiple coats to ensure adequate coverage and uniform texture across the entire surface sprayed. After application, the film is allowed to dry, with the solvent becoming fugitive to the system; but in a specific order where the tail solvent, in this case xylene, provides for adequate leveling. The following paragraphs list examples of formulations used to form an embodiment of the film disclosed herein:

Example 1: Subject Coating/Film Formulation

| Ingredient | Percent by Weight |
|---|---|
| Styrene/ethylene/butylene/styrene liner triblock copolymer, e.g., sold by Kraton Performance Polymers, Inc. under the designation "Kraton G-1652" | 6.51 |
| Hydrocarbon resin - e.g., Plastolyn 290 sold by Eastman Chemical Company | 5.7 |
| Tackifier e.g., Eastotac H100 W sold by Eastman Chemical Company | 1.14 |
| Silicon dioxide Thixotrope sold by Cabot Corp. e.g., Cabosil M-5 | 0.57 |
| Hindered amine light stabilizer (HALS) Chemstab LS-292 e.g., distributed by TMC Materials, Inc. | 0.20 |
| UV stabilizer Chemsorb LS-328 e.g., distributed by TMC Materials, Inc. | 0.20 |
| Antioxidant Chemnox AN-1010 e.g., distributed by TMC Materials, Inc. | 0.20 |
| A solvent blend including a mixture of 22 I 11 I 9 of xylene, toluene, and naphtha. | 85.47 |

Example 2: Subject Coating/Film Formulation

| Ingredient | Grams | Percent by Weight |
|---|---|---|
| Kraton 1652 | 32 | 6.50% |
| Plastolyn 290 | 28 | 5.69% |
| Eastotac H100 | 4.5 | 0.91% |
| Cab-o Sil M5 | 3.7 | 0.75% |
| Chemstab | 1.8 | 0.37% |
| Chemsorb | 1.3 | 0.26% |
| Chemnox | 1 | 0.20% |
| Xylene | 220 | 44.69% |
| Toluene | 120 | 24.38% |
| Naphtha | 80 | 16.25% |
| TOTAL | 492.3 | 100.00% |

Example 3: Pigmentation

| Pigment | Ounces/gallon by weight in Ounces |
|---|---|
| Covert Black 12808-A | 3 |
| Killa Red R-8174 | 3 |
| Bright White W-4514-B | 5.7 |
| Primer Gray 12823 | 5.7 |
| Glacier Blue B-7934 | 4.7 |
| Lethal Blue B-6591-A | 4.2 |
| Venom Green G-7380-A | 4.2 |
| Incendiary Yellow Y-3922-A | 5.7 |
| Agent Orange O-1981-B | 5.7 |
| Purple P-1468-A | 5.8 |
| Pink R-8187-A | 5.2 |
| Mil Spec Tan T-6276 | 4.2 |
| Mil Spec Green G-7384 | 3.2 |
| Gangsta Black KSEB-2022 | 3 |

Another layer of gloss coating is also an option for the coating described herein. One example is a spray-able gloss coating having a slow activator such as, but not limited to, SEM 50501 EZ Clear Coat. Applying this kind of gloss coat to the peel-able coating formulation described above gives the shiny finish that users desire and still allows the resulting finish to be peeled off without damaging the paint and clear coat below.

In a second embodiment, the composition comprises a thermoplastic elastomer further comprising a styrene/ethylene/butylene/styrene linear triblock copolymer, preferably hydrogenated poly(styrene-ethylene-butadiene-styrene) ("SEBS"), in an amount from 7.0-18% by volume. The composition also preferably includes a mid-block modifier such as polybutene in an amount from 1.0-5.0% by volume. The use of polybutene with a SEBS copolymer is preferred because the polybutene conveys improvements in tensile properties as compared to the use of paraffinic process oils.

The composition further comprises: a tackifier in the form of a hydrocarbon resin in an amount between 0.5-3.0% by volume; a thixotrope, preferably a silica having a particle size less than 14.5 in an amount between 0.5-3.0% by volume; an antioxidant, preferably an amine, in an amount between 0.1-0.5% by volume; at least one UV stabilizer, preferably two, each in an amount between 0.2-1.0% by volume; a surfactant in an amount between 0.3-1.0% by volume; a matting agent, preferably a fumed silica having a mean particle size of 14 nm, in an amount between 0.2-1.0% by volume; a static electricity mitigation agent, including products produced by Innospec® such as Statsafe 3000, in an amount between 0.1-0.5% by volume; a silica suspension agent, including but not limited to 1-methoxy-2-propanol acetate, in an amount between 0.05-0.75% by volume; and a solvent blend including a mixture of xylene, acetone, and naphtha in an amount by volume of 45-65% by volume xylene, 1.0-7.0% by volume acetone, and 16-22% by volume naphtha. The static electricity mitigation agent may be necessary only in situations where high speed mixing is implemented due to the relatively high volatility of the components of the composition.

One point of novelty of the second embodiment is that it allows for a clear protection similar to paint protection film ("PPF") of the vehicle upon which the composition is applied. Additionally, the composition is similar to a factory OEM application and allows for the edges of the vehicle to get full coverage, thereby preventing the appearance of seams and the accumulation of dirt or other particles contrasted to existing stick-on/peel-off technologies or other technologies where the application of a composition would result in a gap at any edge. The second embodiment has similar attributes as the first embodiment concerning color change and allowing for a 2K gloss to be applied.

These and other aspects of the film composition and method of making the same are set forth in the claims below.

What is claimed is:

1. A method of applying a coating composition to a vehicle comprising:
    spraying a coating composition on a vehicle, the coating composition further comprising:
        a triblock copolymer;
        a mid-block modifier;
        a tackifier;
        a thixotrope;
        a solvent blend further comprising between 45 to 65 percent by volume xylene, 15 to 35 percent by volume naphtha, and 1 to 10 percent by volume acetone;

an antioxidant;
a matting agent;
a UV stabilizer; and
spraying a 2K gloss on top of the coating composition.

2. A method of applying a coating composition to a vehicle comprising:
spraying a coating composition on a vehicle, the coating composition further comprising:
a triblock copolymer;
a tackifier;
a silica;
a solvent blend further comprising between 45 to 65 percent by volume xylene, 15 to 35 percent by volume naphtha, and 1 to 10 percent by volume acetone;
an antioxidant;
a UV stabilizer; and
spraying a 2K gloss on top of the coating composition.

3. A coating composition comprising:
a triblock copolymer;
a tackifier;
a silica;
a solvent blend further comprising between 45 to 65 percent by volume xylene, 15 to 35 percent by volume naphtha, and 1 to 10 percent by volume acetone;
an antioxidant; and
a UV stabilizer.

* * * * *